US007200941B2

(12) United States Patent
Myers

(10) Patent No.: US 7,200,941 B2
(45) Date of Patent: Apr. 10, 2007

(54) CHAINSAW THROTTLE AND BRAKE MECHANISMS

(76) Inventor: Kent J. Myers, 9090 Stallion Rd., Magnolia, OH (US) 44643

(*) Notice: Subject to any disclaimer, the term of this patent is extended or adjusted under 35 U.S.C. 154(b) by 134 days.

(21) Appl. No.: 11/180,442

(22) Filed: Jul. 12, 2005

(65) Prior Publication Data

US 2007/0011888 A1 Jan. 18, 2007

(51) Int. Cl.
*B23D 57/02* (2006.01)
*B27D 27/00* (2006.01)
*B60T 13/04* (2006.01)

(52) U.S. Cl. .......................... 30/382; 30/381; 30/385; 188/77 R; 188/166

(58) Field of Classification Search .................. 30/382, 30/381, 383–385, 183, 184, 189, 190; 188/166, 188/177 R
See application file for complete search history.

(56) References Cited

U.S. PATENT DOCUMENTS 3,739,475 A * 6/1973 Moore ......................... 30/383
3,776,331 A * 12/1973 Gustafsson ................. 188/166
4,367,813 A 1/1983 Wieland et al.
4,573,556 A * 3/1986 Andreasson ................ 188/137
4,594,780 A 6/1986 Schliemann et al.
4,651,423 A * 3/1987 Grogan ........................ 30/382
4,683,660 A 8/1987 Schurr
4,721,193 A * 1/1988 Nagashima ............... 192/17 R
4,753,012 A 6/1988 Schurr
5,184,403 A * 2/1993 Schliemann ............... 30/123.4
5,791,057 A * 8/1998 Nakamura et al. ............ 30/381
5,813,123 A 9/1998 Widland et al.
5,915,795 A * 6/1999 Nakamura et al. ............ 30/382
RE37,832 E 9/2002 Nakamura et al.
6,588,110 B2 * 7/2003 Galster et al. ................ 30/382
6,842,987 B1 1/2005 Martinson et al.

* cited by examiner

*Primary Examiner*—Lee D. Wilson
*Assistant Examiner*—Alvin J. Grant
(74) *Attorney, Agent, or Firm*—Renner, Kenner, Greive, Bobak, Taylor & Weber

(57) ABSTRACT

A chainsaw is provided having a brake band disposed about a drum that rotates during advancement of the saw chain about the saw bar. An end of the brake band is biased to a position that draws the brake band tight about the drum to prevent advancement of the saw chain, and the throttle trigger of the chainsaw is associated with this biased end to push the band against the bias and release the drum when the throttle trigger is squeezed to drive the elements of the chainsaw that serve to advance the saw chain. Also provided are new concepts for associating throttling and braking elements with the throttle trigger.

7 Claims, 6 Drawing Sheets

CHAINSAW THROTTLE AND BRAKE MECHANISMS

TECHNICAL FIELD

The present invention generally relates to chainsaws, and, more particularly, relates to braking mechanisms for providing added safety features to typical chainsaws. This invention is focused on handling chain run down.

BACKGROUND ART

Chainsaws are potentially dangerous tools even when operators exercise extreme caution during their use. Over the years, chainsaws have been manufactured to include braking mechanisms that are intended to function to stop the rotation of the saw chain about the saw bar in the event that the saw bar and the chain thereabout kick backwards toward the operator. These "kickback" brakes operate either through centrifugal forces or through impact of a front hand guard with the operator's support arm used to support and maneuver the chainsaw. In either case, the kickback brakes operate through the movement of various elements from active positions, where the saw chain is permitted to rotate about the chain guide, to brake positions, where the saw chain is braked. When the kickback brakes are activated, the saw chain is stopped through well-known typically spring biased mechanisms.

Chainsaws typically operate in such a manner that the saw chain may continue to rotate about the saw bar when the operator has let up on the throttle. This is known as "chain run down." Even when the throttle is fully released, there is a chance that the saw chain may be moving at a rate fast enough to be dangerous. Attempts have therefore been made to associate components of the braking mechanism with the throttle to brake the saw chain upon release of the throttle and release the saw chain from the braked state upon squeezing the throttle. It is believed that these attempts have failed, because they provided a chainsaw having a throttle that was too difficult to squeeze and keep depressed, causing finger fatigue and shock to the finger squeezing the throttle trigger, when the front hand guard is activated. An example is provided in U.S. Pat. No. 4,683,660, wherein a link extends from components of the brake mechanism to the throttle such that squeezing the throttle pulls on the brake mechanism to release its braking of the saw chain, and letting up on the throttle allows the brake mechanism to return to a position that stops the moving saw chain. Similar chainsaw embodiments are provided in U.S. Pat. Nos. 4,594,780; 4,753,012; 5,813,123; and 6,842,987.

Although the prior art has addressed the inherent dangers in operating a chainsaw and has provided mechanisms in an attempt to make chainsaw operation safer, a need still exists for improved safety mechanisms that deal with chain run down. A further need exists for chainsaw mechanisms that reduce finger fatigue.

SUMMARY OF THE INVENTION

This invention provides advantages in a chainsaw comprising a brake drum; a saw bar; a saw chain disposed about said saw bar, wherein rotation of said brake drum at sufficient velocity causes said saw chain to be advanced about said saw bar; and a brake band disposed around said brake drum for braking the same. In accordance with this invention, the brake band includes a first movable end that is associated with a first biasing member and an independent second movable end that is biased by a second biasing member to draw said brake band against said brake drum and thereby prevent the rotation of said brake drum, i.e., chain run down. A throttle control trigger is operatively associated with said second movable end of said brake band and has an off throttle position and an on throttle position, wherein, when said throttle control trigger is moved from said off throttle position to said on throttle position, said second movable end moves against said second biasing member, thereby loosening said brake band from said brake drum and permitting the rotation of said brake drum, and, when said throttle control trigger is moved from said on throttle position to said off throttle position, said second movable end is moved by said second biasing member to draw said brake band against said brake drum and thereby prevent the rotation of said brake drum, i.e., chain run down.

BRIEF DESCRIPTION OF THE DRAWINGS

For a complete understanding of the objects, embodiments and structure features of the present invention, reference should be made to the following detailed description and accompanying drawings wherein.

BRIEF DESCRIPTION OF THE PREFERRED EMBODIMENTS

Figure 1:
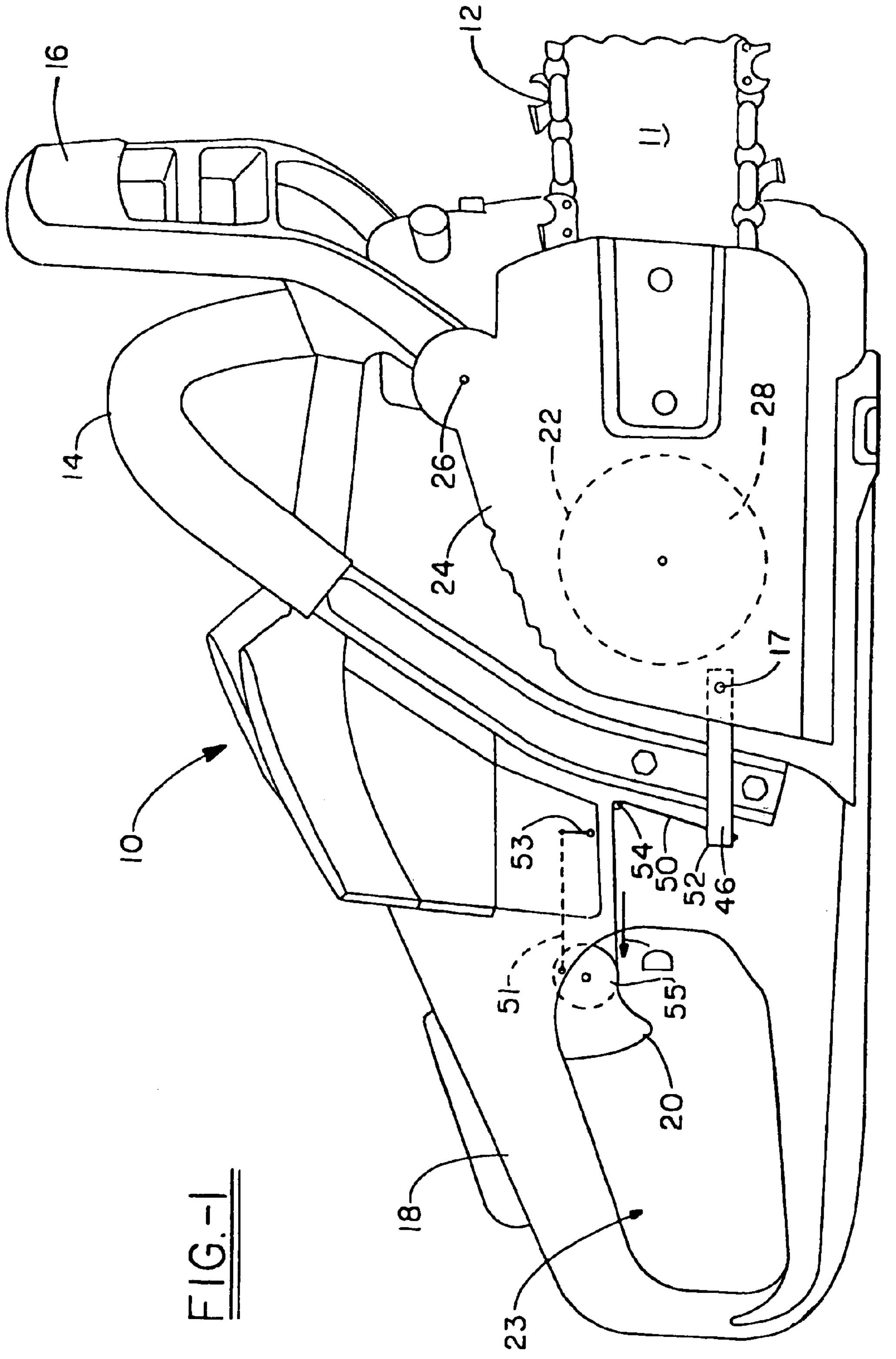
FIG. 1 is a side view of a chainsaw in accordance with this invention, shown with the throttle control trigger in the released (i.e., off throttle) position.

Referring now to FIG. 1, a chainsaw (or power saw) in accordance with this invention is shown and designated by the numeral 10. Chainsaw 10 includes saw bar 11, about which saw chain 12 rotates. Handle frame 14 is secured to the main body of chainsaw 10, with front hand guard 16 located in front of it. Rear handle 18 is provided for gripping chainsaw 10 and providing access to throttle control trigger 20, which is shown in the normal off throttle position, at handle opening 23. Component cover plate 24 covers and/or houses (explained below) components controlling the advancement of saw chain 12 about saw bar 11. Cover plate

24 also covers and/or houses braking mechanisms to control saw chain 12. These braking mechanisms are actuated by front hand guard 16, when it is moved forward about pivot point 26, whether by inertia or by contacting the operator's arm positioned at handle frame 14. This is all conventional and well-known prior art, and will be known to those of ordinary skill in the art.

Chainsaws are primarily provided in two well-known configurations, termed "inboard" and "outboard," which refer to the location of the brake band and the kickback brake mechanisms that are associated with the front hand guard. In inboard configurations, the brake band and kick-back brake mechanisms are secured in the main body of the saw, behind the cover plate. In outboard configurations, the brake band and brake mechanisms are secured to the back-side of the cover plate. It will be readily apparent how this invention will be practiced with either the inboard or out-board configuration, although it is intended that the outboard configuration be shown here. Additionally, it will be appreciated that different kickback braking mechanisms are provided in different chainsaws, and, although a particular configuration is shown, it will be readily apparent how this invention will be practiced with other braking mechanisms. Typically, these braking mechanisms work through the movement of lever arms and spring biased members when the kickback brake is activated through the movement of the front hand guard.

In the prior art, the saw chain is operatively connected to a brake drum, and the brake drum is rotated to cause the saw chain to be advanced around the saw bar. Typically, the brake drum is rotated by a centrifugal clutch to advance the saw chain around the chain guide, but the present invention is not limited thereto or thereby. As known, the centrifugal clutch is activated by squeezing the throttle trigger. The brake band is disposed around the brake drum, and is fixedly secured to the main body of the saw at one end, while being secured at its other end to movable braking mechanism components associated with the kickback braking mechanism and the front hand guard. In the prior art, when the kickback braking mechanism is not activated, the brake band is loose around the brake drum, allowing the brake drum to rotate and permitting the advancement of the saw chain about the saw bar. When the kickback braking mechanism is activated through movement of the front hand guard, the braking mechanisms pull on the movable end of the brake band to tighten the brake band about the brake drum and prevent further advancement of the saw chain about the saw bar. Again, this is all well-known to those of ordinary skill in the art, and it is from these well-known configurations that the present invention departs in order to provide benefits heretofore never realized in the chainsaw arts.

The present invention significantly alters the functioning of the brake band, particularly in relation to the brake drum and the throttle control trigger that is squeezed to power and advance the saw chain about the saw bar. More particularly, a spring bias acts on the typically stationary end of the brake band, and the brake band is associated to move when the throttle control mechanism is manipulated. Through practice of the present invention, the brake band is tightened or loosened about the brake drum according to the position of the throttle control trigger. Thus, the tightening of the brake band around the brake drum (and resultant braking of the chain) is not dependant only upon the activating of the kickback braking mechanism. Rather, in the present invention, the tightening and loosening of the brake band around the brake drum is dependant upon the squeezing and releasing of the trigger, when the kickback braking mechanism is not activated. However, the mechanisms used to associate the brake band with the trigger are independent of and do not frustrate the normal operation of the kickback braking mechanism. Even when the brake band is associated with the trigger as taught by this invention, the brake band may be caused to engage the brake drum and prevent the advancement of the saw chain about the saw bar by activating the kickback braking mechanism. Beneficially, in this invention, when the kickback braking mechanism is activated, there is no resultant shock to the trigger finger while the chainsaw is being operated in the on throttle position.

Figure 3:
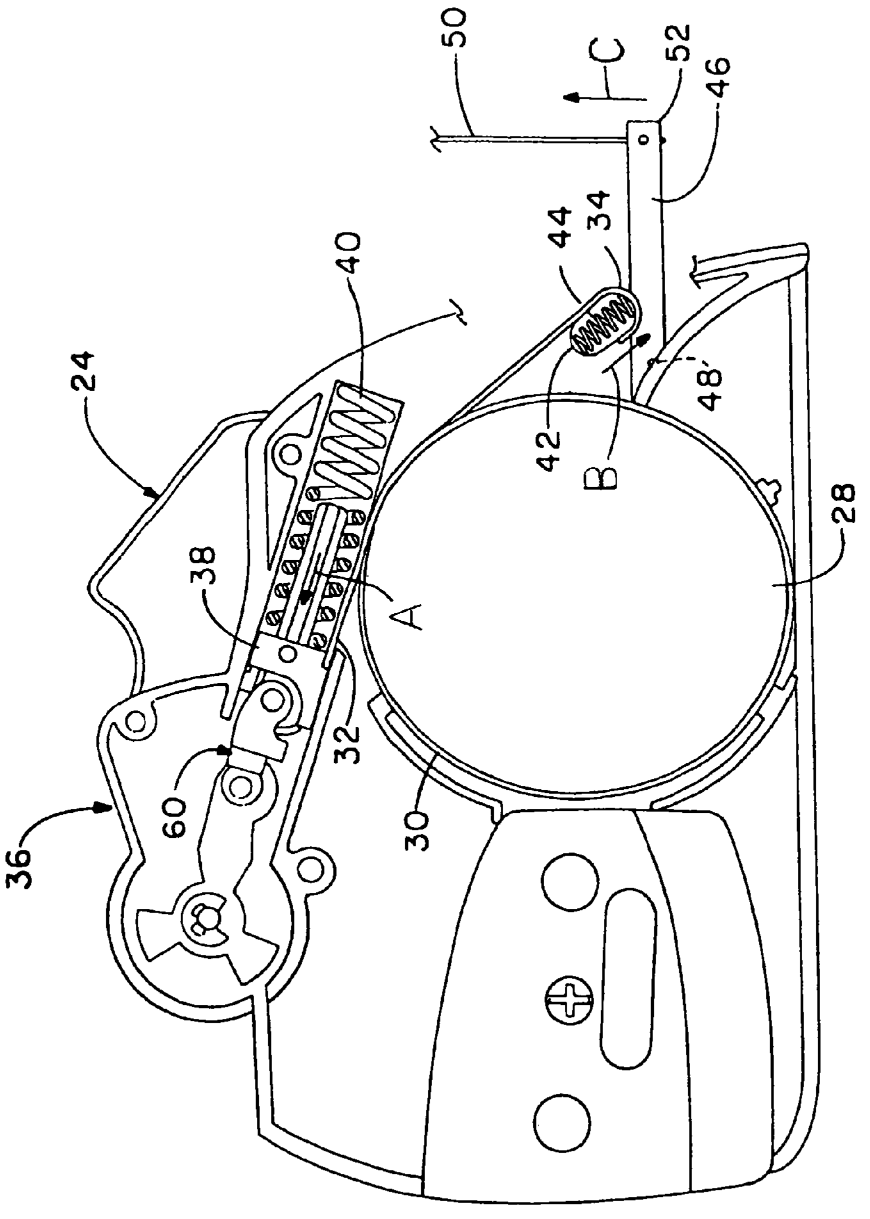
FIG. 3 is an exploded side view of the braking mechanics of a chainsaw in accordance with this invention, shown as viewed in an "outboard" type cover plate and shown with the throttle control trigger in the released position, i.e., off throttle, and it should be understood that such braking mechanics may be practiced in an "inboard" configuration as well.

With reference to FIGS. 1 and 3, the present invention is described in its normal off throttle position. In FIG. 3, an outboard cover plate is shown removed from chainsaw 10 and turned to view the components carried thereby. These outboard type cover plates are well known, and carry the brake band and braking components of the kickback brake mechanism. It will be appreciated that the concepts and structural configurations disclosed here with respect to the outboard embodiment may be readily applied in an inboard embodiment. In either an inboard or outboard embodiment, brake drum 28 is provided in the main body of chainsaw 10, and brake band 30 fits there over. Squeezing trigger 20 rotates a centrifugal clutch that engages and rotates brake drum 28 and advances saw chain 12 about saw bar 11. If the brake drum 28 is stopped, then the saw chain 12 is also stopped. Brake band 30 is disposed around brake drum 28, and is secured to other components of chainsaw 10 at first movable end 32, and second movable end 34. First movable end 32 is connected to braking mechanism 36 at piston 38, which is biased in the direction of arrow A by compression spring 40. The position of piston 38 is limited by the interaction of other components of braking mechanism 36. In the position shown in FIG. 3, the kickback brake has not been activated and, in the prior art, this would allow brake band 30 to be loose enough on brake drum 28 to allow for the rotation of brake drum 28 and the advancement of saw chain 12. However, the present invention changes this general configuration, and provides a second movable end 34, where a stationary end is used in the prior art. As will be understood below, this allows for the independent braking and releasing of brake drum 28 by brake band 30, even when the kickback brake is not activated.

Second movable end 34 is biased from support 42 by spring 44, which urges second movable end 34 in the direction of arrow B. Spring 44 is strong enough to pull brake band 30 against brake drum 28 with enough force to prevent the movement of brake drum 28. Thus, when trigger 20 is in the normal off throttle position, saw chain 12 simply cannot be advanced about saw bar 11. This is much different than in the prior art, wherein it is common for an idling chainsaw to be seen with the saw chain advancing around the saw bar. By preventing such chain run down, this invention provides a safety benefit beyond that provided by the prior art.

Figure 2:
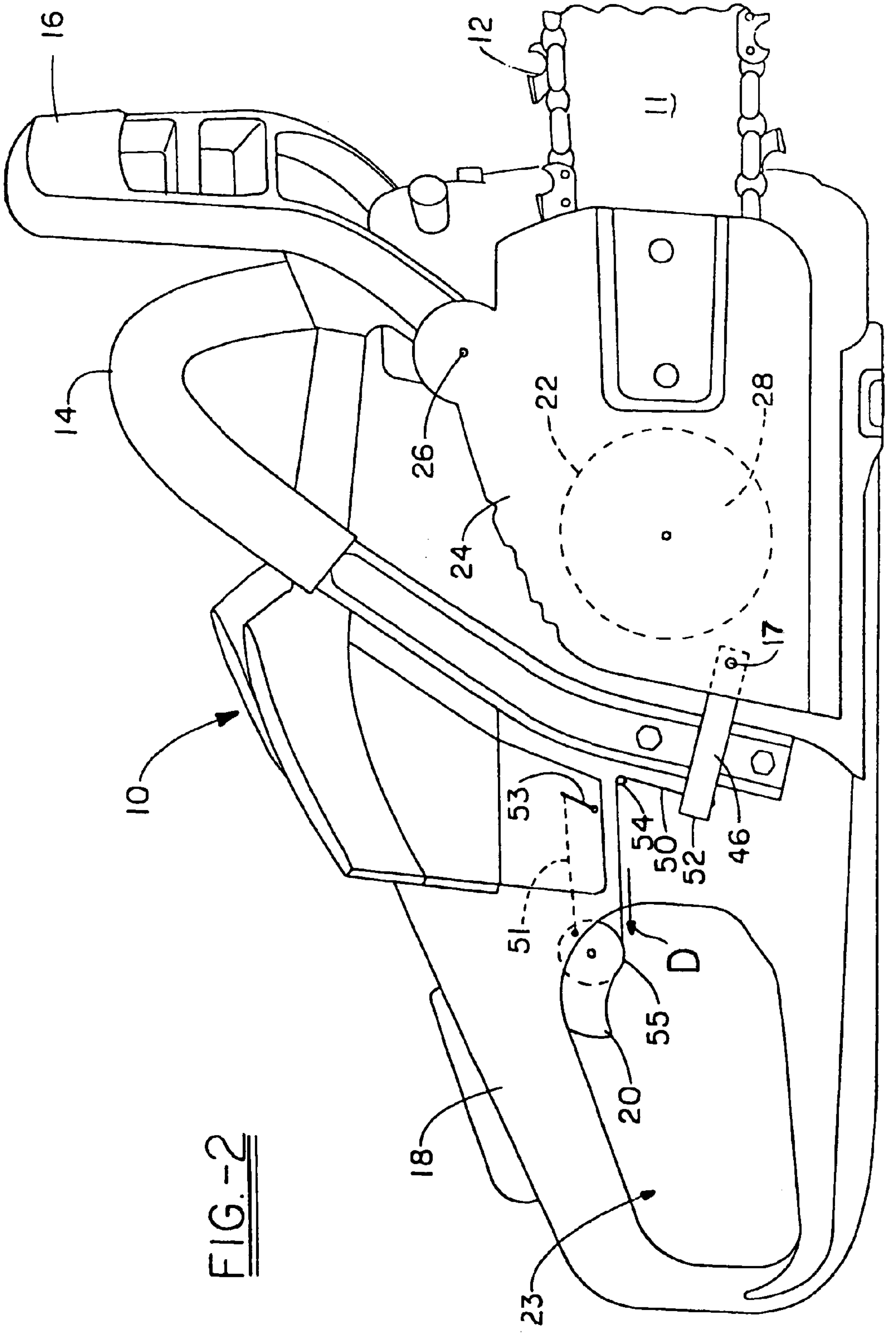
FIG. 2 is a side view of a chainsaw in accordance with this invention, shown with the throttle control trigger in an activated (i.e., on throttle) position.
Figure 4:
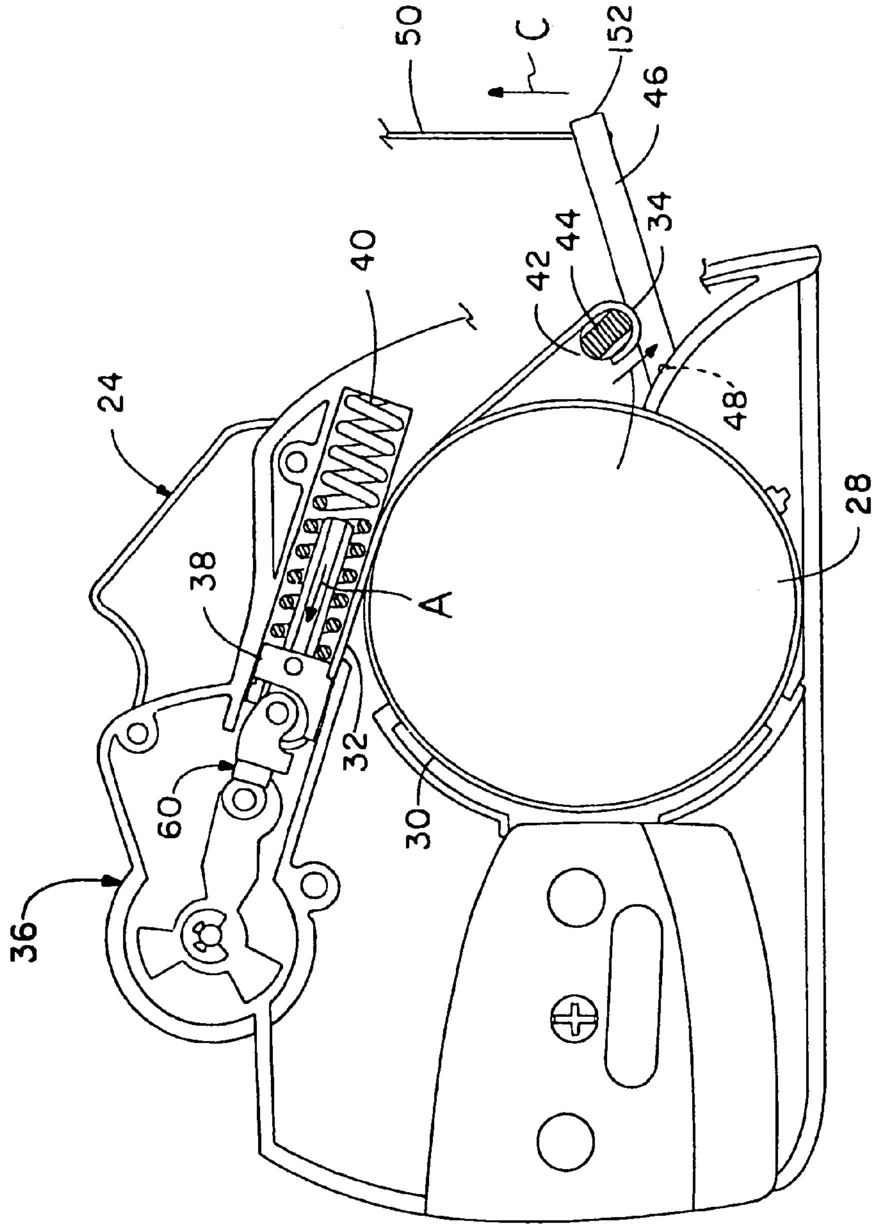
FIG. 4 is an exploded side view of the braking mechanics of a chainsaw in accordance with this invention, shown as viewed in an outboard type cover plate and in an on throttle position, and it should be understood that such braking mechanics may be practiced in an inboard configuration as well.

Second movable end 34 is functionally associated with trigger 20 such that movement of trigger 20 from the normal off throttle position (trigger not squeezed) to an on throttle position (trigger squeezed) will allow chain 12 to be advanced around saw bar 11 (i.e., will loosen brake band 30 from brake drum 28). Particularly, actuator bar 46 engages second movable end 34 to move the same when trigger 20 is squeezed by a chainsaw operator. Actuator bar 46 is secured to cover plate 24 at pivot point 48, and is secured to cable 50 at an opposite end 52 of actuator bar 46. Cable 50 is preferably a Bowden cable. Brake band 30 engages actuator bar 46 at some point between pivot point 48 and cable 50 such that movement of cable 50 in the direction of arrow C causes actuator bar 46 to press up against the bias of spring 44 against second movable end 34. It will be appreciated that this movement will loosen brake band 30 from brake drum 28. With reference to FIGS. 1–4, it will be appreciated that cable 50 is moved in the direction of arrow C through the squeezing of trigger 20 due to the fact that cable 50 is connected to move with trigger 20 after advancing around a support 54. More particularly, squeezing trigger 20 (as seen in FIGS. 2 and 4), pulls cable 50 in the direction of arrow D about support 54, thus pulling the end connected to actuator bar 46 in the direction of arrow C. It will be appreciated that there is no physical gap shown between brake band 30 and brake drum 28 in FIG. 4 because the clearance is very small. Nevertheless, it will be understood that brake drum 28 will be permitted to rotate when second movable end 34 is moved against the bias of spring 44.

By connecting cable 50 to trigger 20, the on throttle position, wherein chain 12 may be advanced about saw bar 11, is achieved upon squeezing trigger 20 to provide the driving force to chain 12, and the braking position is achieved upon release of trigger 20. As known, throttle rod 51 is associated with trigger 20 and a carburetor 53 such that squeezing trigger 20 moves rod 51 and opens carburetor 53, and releasing trigger 20 moves rod 51 to close carburetor 53. Assuming that the kickback brake mechanism has not been activated, brake band 30 engages brake drum 28 to stop chain run down as the system is being throttled down, and the life of brake band 30 is thus extended, as wear on brake band 30 is reduced.

It should be appreciated that "actuator bar" is to interpreted very broadly because virtually any structure rotating about a pivot point may be used to press against the second movable end of the brake band. And although a particular pivot point and orientation was chosen for disclosure, other orientations and pivot points could be used to cause the actuator bar to contact the second movable end as desired.

Figure 5:
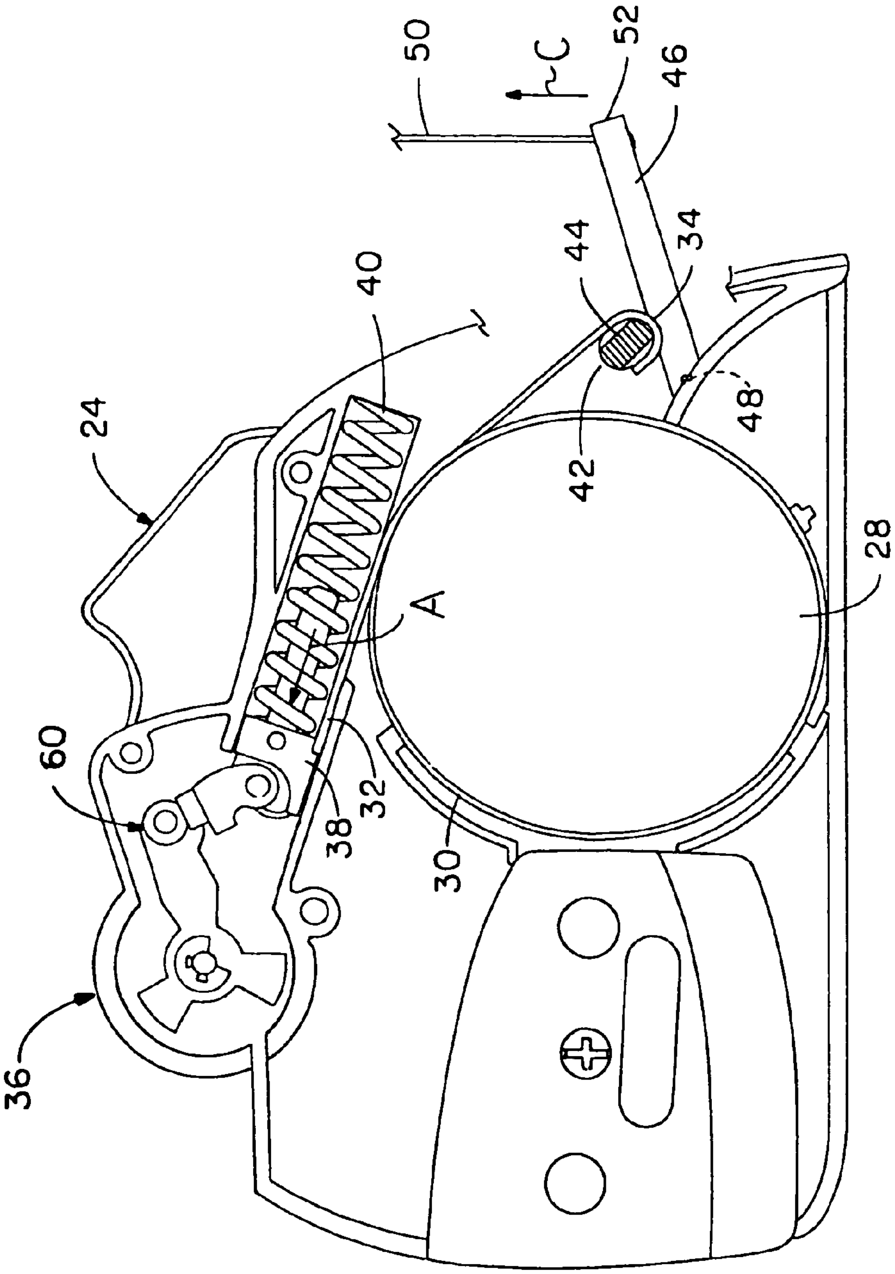
FIG. 5 is an exploded side view of the braking mechanics of a chainsaw in accordance with this invention, shown as viewed in an outboard type cover plate and in an on throttle position, wherein the front hand guard has been activated.

In FIG. 5, the relevant components of a chainsaw in accordance with this invention are shown as they would be when a chainsaw operator is squeezing throttle control mechanism 20 (i.e., on throttle) and the kickback brake mechanisms 36 are activated through movement of front hand guard 16. When front hand guard 16 is contacted to activate braking mechanism 36, compression spring 40 moves piston 38 further in the direction of arrow A due to the movement at toggle joint mechanism 60. This moves first movable end 32 of brake band 30 into a position wherein brake band 30 is drawn tightly against brake drum 28 to stop the rotation of brake drum 28 and prevent further advancement of saw chain 12. Saw chain 12 is stopped despite the position of second movable end 34, which has been moved against the bias of spring 44 due to the squeezing of trigger 20. Due to the configuration employed here, wherein the trigger is isolated from the kickback brake mechanism, and the biasing elements of the kickback brake mechanism operate independently of the biasing element acting on the second movable end of the brake band, there is no shock to the trigger finger upon the activation of the kickback braking mechanism. It will be appreciated that other kickback brake mechanism configurations could be employed.

Figure 6:
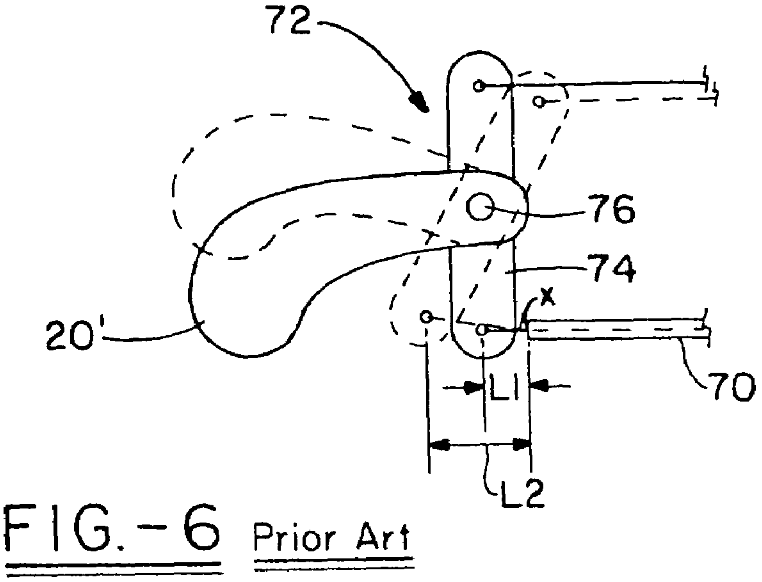
FIG.-6 Prior Art
FIG. 6 is a schematic view of prior art throttle control mechanisms employing lever arms.
Figure 7:
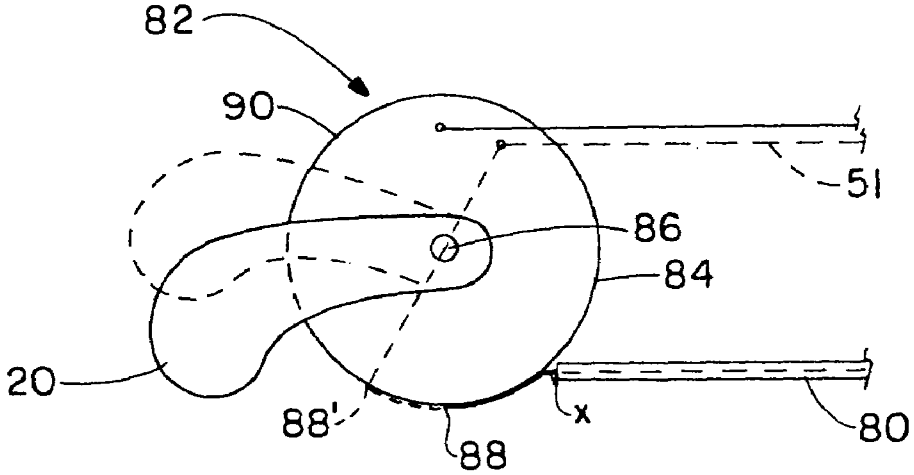
FIG. 7 is a schematic view of an embodiment of a throttle control mechanism in accordance with a preferred embodiment of this invention, employing what is termed herein as an "arced brake control."

In particularly preferred embodiments, the connection between throttle control mechanism 20 and cable 50 is configured to provide advantages over prior art connections. FIG. 6 is provided to show the general configuration of the prior art, and FIG. 7 is provided to show the configuration provided in a preferred embodiment according to this invention. The configuration provided in the prior art and generally depicted in FIG. 6 may be employed in accordance with this invention, but, particularly for reasons of finger fatigue, the configuration as disclosed with reference to FIG. 7 is preferred. FIGS. 6 and 7 are minimized to show only the relevant elements.

FIG. 6 generally depicts a prior art chainsaw that employs a cable that is pulled by squeezing the throttle control trigger. A general example of such a chainsaw may be found in U.S. Pat. No. 4,683,660. In the prior art embodiment shown in FIG. 6, cable 70 is connected to throttle control mechanism 72 through a lever arm 74, which shares a common pivot point 76 with throttle control trigger 20'. In order to help disclose the advances provided by the preferred connection means of this invention, cable 70 is considered to be fixed at point "X" shown in FIG. 6. When trigger 20' is squeezed, cable 70 is pulled to a new position defined by the movement of lever arm 74. Such a position is shown in phantom in FIG. 6, and the distance cable 70 is pulled is the difference between the length of cable extending from X to the lever arm 74 in the pre-squeezed position (herein measured between the lines defining L1) and the length extending from X to lever arm 74 in the squeezed position (herein measured between the lines defining L2). Notably, cable 70 always extends in a straight line from fixed end X to lever arm 74. Thus, the length between L1 is compared to the length between L2 to determine the actual distance that cable 70 is pulled. And although the connection point of cable 70 on lever arm 74 travels through an arc, the distance that cable 70 is pulled is defined by the straight lines mentioned above.

Referring now to FIG. 7, a throttle control mechanism in accordance with a preferred embodiment of this invention is shown and designated by the numeral 82. It can be seen that the lever arm of the prior art (e.g., lever arm 74) is replaced by what is termed herein an "arced brake control" 84, which pivots with throttle control trigger 20 at pivot point 86. Cable 80 extends from a fixed point designated at "X" to connection 88 at the periphery 90 of arced brake control 84. Thus, when trigger 20 is squeezed, cable 80 is pulled to a new position that is defined by the amount of cable 80 taken up by the periphery 90 of arced brake control 84. Thus, even when the distance between pivot point 86 and the connection of cable 80 to arced brake control 84 is the same as the distance between pivot point 76 and the connection of cable 70 to lever arm 74, squeezing trigger 20 the same distance as trigger 20' causes cable 80 to be pulled further than cable 70 because cable 80 must wind around the periphery 90 of arced brake control 84. In order to configure a prior art lever arm 74 to pull the same length of cable as pulled by arced brake control 80, lever arm 74 must be extended, and the extension of lever arm 74 will require a greater deal of force against trigger 20' to pull cable 70, causing greater finger fatigue. Thus, the preferred arced brake control 84 of FIG. 7 permits more cable to be pulled at a lesser pulling force than the lever arms of the prior art.

It should be appreciated that the focus of this arced brake control is on pulling the cable around a periphery of the arced brake control, and, thus, it is not absolutely necessary that the cable be secured at the perimeter of the arced brake control so long as the length of cable is pulled by winding the length about the controller. "Winding," in this context, entails any length of cable extending around the periphery, and it does not require that it actually wind 360 degrees around the arced brake control. Additionally, while a circular arced brake control is shown and is sufficient, other arcs, including cycloidal arcs, could be used and should be understood as being covered by the terms “arc” or “arced.” A cycloidal arc may lessen the finger fatigue to an even greater extent.

While a full and complete description of the invention has been set forth in accordance with the dictates of the patent statutes, it should be understood that modifications can be resorted to without departing from the spirit hereof or the scope of the appended claims.

What is claimed is:

1. A chainsaw comprising:

a brake drum;

a saw bar;

a saw chain disposed about said saw bar, wherein said brake drum rotates as said saw chain is advanced about said saw bar, and preventing said brake drum from rotating prevents said saw chain from advancing about said saw bar;

a brake band disposed around said brake drum and having a first movable end that is associated with a first biasing member and a second movable end that is biased by a second biasing member to draw said brake band against said brake drum and thereby prevent the rotation of said brake drum;

a throttle control trigger movable between an off throttle position and an on throttle positions;

an actuator bar secured to pivot about a pivot point; and a cable secured at one end to move with said throttle control trigger and secured at an opposed end to said actuator bar, said second movable end of said brake band being positioned in close proximity to said actuator bar, wherein, when said throttle control trigger is moved from said off throttle position to said on throttle position, said cable pulls on said actuator bar so that said actuator bar pivots about said pivot point and contacts and moves said second movable end against said second biasing member, thereby loosening said brake band from said brake drum and permitting the rotation of said brake drum, and, when said throttle control trigger is moved from said on throttle position to said off throttle position, said second movable end is moved by said second biasing member to draw said brake band against said brake drum and thereby prevent the rotation of said brake drum.

2. The chainsaw of claim 1, wherein a mechanism providing said biasing force is positioned between said second movable end of said brake band and a stationary support.

3. The chainsaw of claim 1, wherein said throttle control trigger is part of a throttle control mechanism having an arced brake control that rotates about a pivot point when said throttle control trigger is moved between said off throttle and said on throttle positions, and said second movable end of said brake band is operatively associated with said arced brake control through said cable such that moving said throttle control trigger from said off throttle to said on throttle position causes a portion of said cable to be wound about a periphery of said arced brake control.

4. The chainsaw of claim 1, wherein said second movable end is positioned between said pivot point of said actuator bar and the connection point of said cable secured thereto.

5. The chainsaw of claim 1, further comprising a kickback brake mechanism, wherein said first movable end of said brake band is associated with said kickback brake mechanism.

6. The chainsaw of claim 5, wherein activating said kickback brake mechanism moves said first movable end of said brake band to draw said brake band against said brake drum, despite the position of said throttle control trigger and said second movable end.

7. The chainsaw of claim 6, wherein said second movable end is biased away from a support, said second biasing member is a spring, and activating said kickback brake mechanism draws said second movable end against said biasing member to be stopped by said support.

* * * * *